United States Patent [19]

Nguyen

[11] Patent Number: 4,814,673
[45] Date of Patent: Mar. 21, 1989

[54] REEL TO REEL TAPE RADIUS MEASUREMENT APPARATUS AND METHOD THEREFOR

[75] Inventor: Thai Nguyen, Lafayette, Colo.

[73] Assignee: Aspen Peripherals Corp., Longmont, Colo.

[21] Appl. No.: 183,142

[22] Filed: Apr. 19, 1988

[51] Int. Cl.⁴ .............................................. G11B 15/32
[52] U.S. Cl. ......................................................... 318/7
[58] Field of Search ................................. 318/6, 7, 254

[56] References Cited

U.S. PATENT DOCUMENTS

| | | | |
|---|---|---|---|
| 4,015,799 | 4/1977 | Koski et al. | 242/203 |
| 4,115,881 | 11/1978 | Eige et al. | 360/50 |
| 4,743,811 | 5/1988 | Katayama | 318/7 |
| 4,777,413 | 10/1988 | Yoshimura et al. | 318/7 |

Primary Examiner—Bentsu Ro
Attorney, Agent, or Firm—Dorr, Carson, Sloan & Peterson

[57] ABSTRACT

In a reel to reel tape transport system for determining the radii of the reel to reel tape by generating a series of forward and reverse pulses from a brushless DC motor driving the reel to reel tape, generating a forward series of pulses when said tape is turning in the forward direction and a reverse series of pulses when the tape is turning in the reverse direction, using a state machine to determine a forward or reverse revolution of the tape despite tape reversals before the completion of the revolution, and a counter and decoder for decoding the output of the state machine to provide an accurate determination of one revolution of the brushless DC motor.

5 Claims, 3 Drawing Sheets

REEL TO REEL TAPE RADIUS MEASUREMENT APPARATUS AND METHOD THEREFOR

BACKGROUND OF THE INVENTION

1. Field of the Invention

The present invention relates to reel to reel tape control systems and, more particularly, the present invention relates to a reel to reel tape radius measurement apparatus utilizing the Hall effect output of brushless DC drive motors.

2. Discussion of Prior Art

In reel to reel tape transport systems, the radius of the tape, at any given instant, is required in the tape control system to accurately keep the tape at a constant velocity.

In the 1977 patent to Koski (4,015,799) one approach to measuring the reel radii is to utilize a supply reel tachometer coupled to the shaft of the supply reel motor and a take-up reel tachometer coupled to the shaft of the take-up motor. The outputs of the two respective tachometers are then processed by motion control logic to determine the reel radii.

The 1978 patent issued to Eige (4,125,881) sets forth a first tachometer to sense the tape motion which generates a single pulse at the completion of a revolution of the reel. The second tape motion sensor is a two-phase fine tachometer having a large number of fine graduations or lines uniformly spaced circumferentially around the tachometer. Based upon the output of the two tachometers, the reel radii can be calculated.

The present invention provides an alternative means for determining the revolution of one of the motors for determination of a full revolution without using a separate tachometer.

SUMMARY OF INVENTION

The problem solved by the present invention is how to sense the revolutions of a brushless DC motor in a reel to reel system without the use of an external tachometer physically attached to the shaft.

The present invention solves this problem by utilizing the Hall Effect output of the brushless DC motor and analyzing that output according to a state machine to accurately provide the revolutions of the brushless DC motor despite reversals or changes of direction during operation periods.

The present invention generates a series of forward and reverse pulses obtained from the brushless DC motor driving the reel to reel tape, generates a forward series of pulses when said tape is turning in the forward direction and a reverse series of pulses when the tape is turning in the reverse direction, uses a state machine to determine progressive forward revolution of the tape despite tape reversals before the completion of the revolution, and uses a counter and decoder for decoding the output of the state machine to provide an accurate determination of one revolution of the brushless DC motor.

DESCRIPTION OF PREFERRED EMBODIMENT

Figure 1:
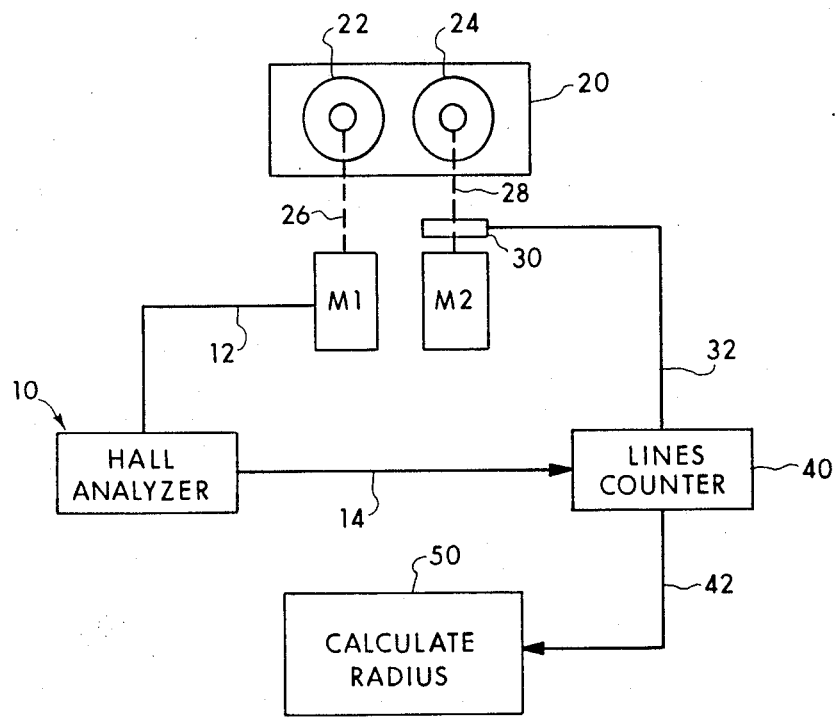
FIG. 1 is a system block diagram for calculating the radius of a reel to reel tape.

In FIG. 1, the present invention 10 is conventionally interconnected with a reel-to-reel tape 20. The reel-to-reel tape 20 has two reels 22 and 24 which are each interconnected to motors M1 and M2. Motor M1 is interconnected to reel 22 over shaft 26 and motor M2 is interconnected to reel 24 over shaft 28.

A tachometer 30 is conventionally attached to shaft 28 and comprises a fine line tachometer. In the preferred embodiment of the present invention, tachometer 30 generates pulses corresponding to 1000 lines per revolution. It is to be expressly understood that more or less than 1000 lines, such as 500 lines, could be used under the teachings of the present invention. These pulses are generated over lead 32 to a lines counter 40.

The Hall Effect analyzer 10 of the present invention receives magnetic signals over lines 12 from motor M1, analyzes those signals and generates a single pulse per revolution output on line 14 which is delivered to the lines counter 40. The output of the lines counter 40 is the number of lines counted by counter 40 between revolutions of motor M1. Line counter 40 is an up-/down counter.

Figure 2:
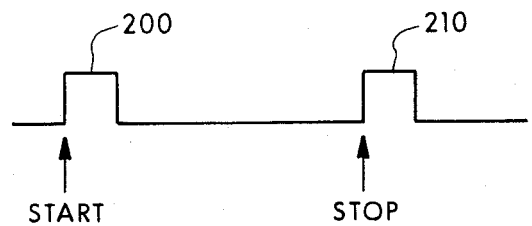
FIG. 2 represents the output pulses of the Hall analyzer of the present invention.

This is more graphically shown in FIG. 2. The pulse 200 in FIG. 2 is generated by the Hall Effect analyzer 10 of the present invention upon the completion of a revolution of the shaft 26 of motor M1. Pulse 210 is the next revolution. The counter 40 becomes activated at the leading edge of pulse 200 and becomes deactivated at the leading edge of pulse 210.

The information from the lines counter 40 is delivered over leads 42 to the circuit 50 which calculates the necessary information for the radius.

It is to be expressly understood that the reel-to-reel tape 20, the tachometer 30, the lines counter 40, and the circuit for calculating the radius 50 are conventional and could, for example, comprise variations of the circuits set forth in the Eige and Koski patents earlier described.

Figure 3:
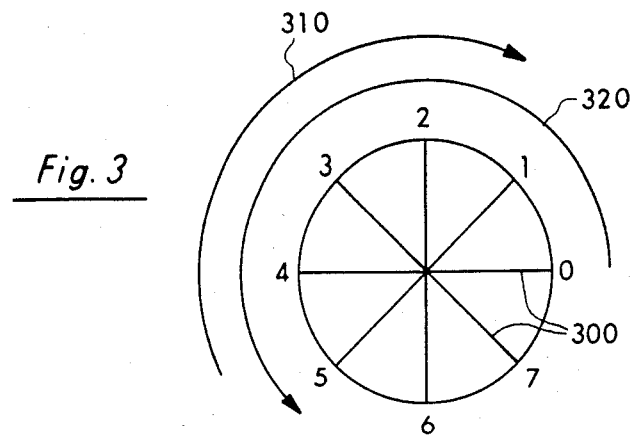
FIG. 3 is an illustration of the revolution of the brushless DC motor about the eight magnetic pole-pairs.
Figure 4:
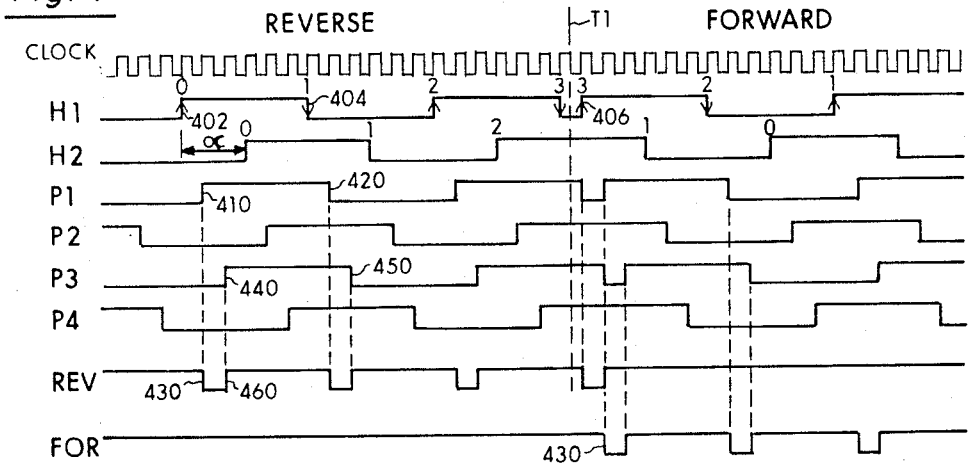
FIG. 4 illustrates the Hall Effect output pulses of the present invention which are used to generate the FOR and REV control pulses of the present invention.

The Hall Effect analyzer of the present invention is shown in FIGS. 3 through 8. Under the teachings of the present invention, the motor M1 is a brushless motor of the type, for example, manufactured by Ametek, 627 Lake Street, Kent, Ohio 44240-1599. This is an eight pole-pairs motor and, as shown in FIGS. 3 and 4, in order to complete one revolution as shown by FIG. 3, eight pole-pairs 300 are transversed within the interior of the motor. Conventionally available as an output from these motors are the two signals H 1 and H2 as shown in FIG. 4 and which are delivered over lines 12 to the Hall Effect analyzer 10 of the present invention. The forward direction is shown by arrow 310 and the reverse direction is shown by arrow 320. It is to be expressly understood that any number of pole-pairs in the motor M1 could be used under the teachings of the present invention.

As shown in FIG. 4, the first output H1 generates pulses as follows. As the motor M1 rotates in the reverse direction 320 and passes pole-pair 0, the low to high transition 402 occurs. At pole-pair 1, a high to low transition 404 takes place. This sequence continues. At time tl, the motor M1 changes direction to the forward direction 310, so that pole-pair 3 is encountered again causing transition 406. Pulses H2 are shifted in phase by alpha degrees from pulses H1, but follow the transition sequence described above. One revolution occurs when four pulses are generated for H1 and H2.

The two pulse streams H1 and H2 are decoded as follows. Pulses P1 and P2 correspond to H1 and H2, respectively, but are synchronized to a 1 MHz clock frequency. Pulses P3 and P4 correspond to P1 and P2 respectively but are delayed in time (e.g., 1 cycle of the clock). Pulses P1 through P4 are decoded under the teachings of the present invention and as shown by the dotted lines in FIG. 4 to produce the forward FOR and reverse REV pulses of the present invention. The decoding occurs as follows:

The REV and FOR pulses are generated by decoding all 4 signals P1, P2, P3 and P4 by the following formula:

Formula 1:
/REV = P1*/P2*/P3*/P4 + /P1*P2*P3*P4

Formula 2:
/FOR = P1*P2*/P3*P4 + /P1*/P2*P3*/P4 where the "/" designation means inversion.

Figure 5:
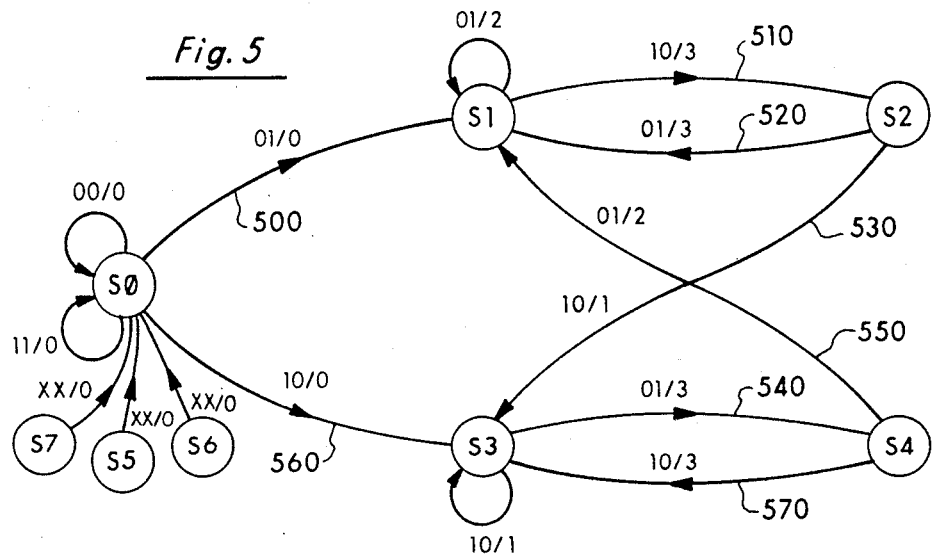
FIG. 5 is a state diagram of the Hall Effect analyzer of the present invention.

A characteristic of the reel-to-reel tape drive system is the rather frequent reversals or change of directions 310 and 320 which occur perhaps several times before the completion of a revolution. Since the present invention senses the magnetic poles within the motor, the reversal situation must be carefully addressed in the state table shown in FIG. 5. As shown in FIG. 5, the states S0 through S7 are defined as follows:

S0 = startup
S2 = moving forward and counting
S2 = change to reverse direction
S4 = change to forward direction
S5–S7 = illegal states Based upon the above states, the following truth table can be established:

TABLE I

| FR | 00 | 01 | 11 | 10 |
| --- | --- | --- | --- | --- |
| S0 | S0 Z = 0 | S1 Z = 0 | S0 Z = 0 | S3 Z = 0 |
| S1 | S1 Z = 3 | S1 Z = 2 | S1 Z = 3 | S2 Z = 3 |
| S2 | S2 Z = 3 | S1 Z = 3 | S2 Z = 3 | S3 Z = 1 |
| S3 | S3 Z = 3 | S4 Z = 3 | S3 Z = 3 | S3 Z = 1 |
| S4 | S4 Z = 3 | S1 Z = 2 | S4 Z = 3 | S3 Z = 3 |
| S5 | S0 Z = 0 | S0 Z = 0 | S0 Z = 0 | S0 Z = 0 |
| S6 | S0 Z = 0 | S0 Z = 0 | S0 Z = 0 | S0 Z = 0 |
| S7 | S0 Z = 0 | S0 Z = 0 | S0 Z = 0 | S0 Z = 0 |

In the table above, the designation "FR" means "forward" or "reverse" and there are four possible combinations of states for forward and reverse. At this time, the loop designation of FIG. 5 must be explained. Each loop has an FR/Z designation. When F is 0, the reel is going in the forward 310 direction and when R equals 0, the reel is going in the reverse 320 direction. Z is an indicator as to whether or not to count the pulses FOR or REV of FIG. 4. Z can have the following states:

TABLE II

Z = 0—reset counter
Z = 1—count down
Z = 2—count up
Z = 3—hold counter (or don't count)

Hence, in the designation shown in FIG. 5, for example, the designation 01/2 at state S1 means F equals 0 (forward direction), R equals 1 (not moving in reverse direction), and Z equals 2 (means count up). Hence, the function being performed at S1 is moving forward and counting up.

In FIG. 5 the Hall Effect analyzer 10 of the present invention is initially in state S0 and will cycle in that state and not count. When the first forward pulse FOR is sensed, the system moves along path 500 to state S1 and commences counting pulses. It loops in that state counting each successive forward pulse FOR. However, when the next pulse is not a forward pulse but a reverse pulse REV, it enters path 510 to state S2 and the next reverse pulse REV sensed causes it move along path 530 to state S3 where it then will decrement the count with each successive reverse pulse REV. If when the state machine is in state S2, the next pulse sensed is a forward FOR pulse, the system enters path 520 to return to state S1 to count successive forward pulses. Likewise, if the system in state S0 senses a reverse pulse REV, the system traverses path 560 to state S3 where it successively counts reverse pulses. In the event the next pulse is a forward pulse, path 540 is entered causing the system to enter state S4 and if the next successive pulse is forward, path 550 causes the system to enter state S1 to count the forward pulses. If in state S4, however, the next pulse is a reverse pulse REV, path 570 is entered and state S3 continues to count the reverse pulses.

Figure 6:
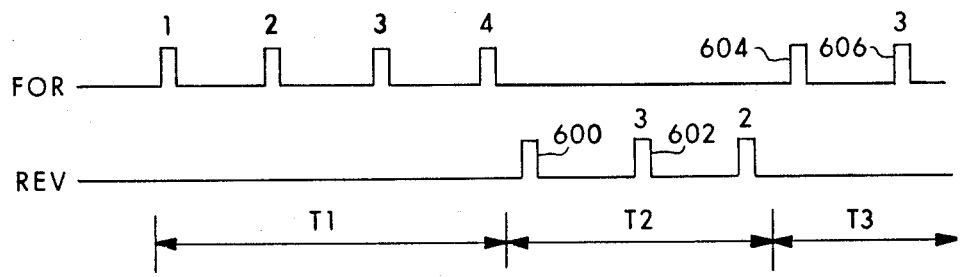
FIG. 6 is an illustration of typical forward and reverse pulses during a change of reversal of the brushless DC motor.
Figure 7:
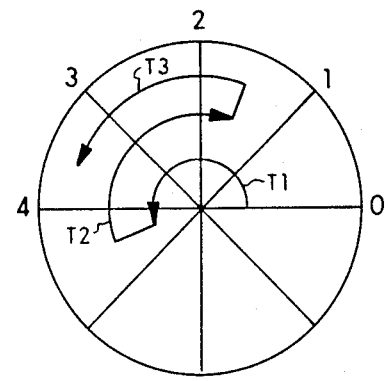
FIG. 7 is a diagram physically showing the change in rotational directions of the DC motor according to the illustration of FIG. 6.

This is best explained by reference to FIGS. 6 and 7. In FIGS. 6 and 7 the forward pulses FOR are labeled 1, 2, 3 and 4 which occur during time T1. These pulses are inverted from those shown in FIG. 4 for purposes of illustration. As shown in FIG. 7, during time T1 the system moves forward past the first four pole-pairs. Hence, the system leaves state S0 along path 500 to state S1 and commences to count pulses 1 through 4. After pulse is counted, the motor reverses and ceases to generate forward pulses and during time T2 reverse pulse 600 is generated. The presence of this reverse pulse causes the system to move along path 510 and to state S2. The next reverse pulse 602 causes the system to move along path 530 to state S3 and to decrement the count from 4 to 3. The next reverse pulse causes the count to go from 3 to 2. At this time, the motor changes direction to the forward direction during time T3. Pulse 604 causes the system to move from state S3 along path 540 to state S4. The next pulse 606 causes the system to leave state S4 along path 550 to state S1 and causes the counter to go from 2 to 3. As can be seen in FIG. 7, the count 3 correctly corresponds to just passing the third pole-pair of the motor M1. In this fashion, the state table of FIG. 5 accurately sets forth the correct count.

Figure 8:
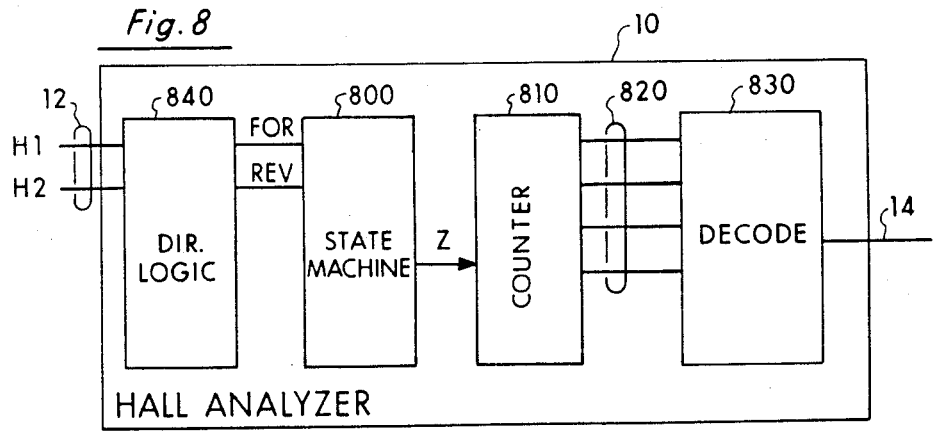
FIG. 8 is a schematic block diagram of the present invention.

The circuit for implementing the state table of FIG. 5 is shown in FIG. 8 and includes a direction logic circuit 840, a state machine 800, a counter 810, and a decode circuit 830. The direction logic 840 receives the H1 and H2 signals over leads 12 from motor M1 and in the present invention is a PAL (programmable array logic) device of the type manufactured by NMI, 2175 Mission College Blvd., Santa Clara, Calif. 95054-1592 as Model No. 16R4. The implementation of the PAL for the direction logic 840 is such to produce the output pulses as discussed above for FIG. 4 and Formulas 1 and 2.

State machine 800 is interconnected to receive the FOR and REV pulses as set forth in FIG. 4 from the direction logic circuit 840. The state machine 800 is a conventional PAL (programmable array logic) of the type conventionally available from NMI, 2175 Mission College Blvd., Santa Clara, Calif, 95054-1592 as Model No. 16R8. The PAL is programmed according to the teachings of FIG. 5 and Table 1. The output of the state machine delivers the signal Z to count up or to count down or to reset or to hold to a conventional counter 810 which performs the actual count in the manner described above. The output of the counter is delivered over lines 820 to a conventional decode circuit 830 for delivery to the output on lead 14 indicating one complete revolution.

It is to be expressly understood that other circuit approaches for accomplishing the teachings of the present invention could be designed. For example, a single PAL could be used for the direction logic circuit 840, the state machine 800, the counter 810, and the decode 830.

While preferred embodiments of the present invention have been shown, it is to be expressly understood that modifications and changes may be made thereto and that the present invention is set forth in the following claims.

I claim:

1. A reel to reel tape (20) transport system having first and second motors (MI, M2) for driving the reel to reel tape, a tachometer (30) connected to a first one of said motors for generating a plurality of output pulses corresponding to a plurality of fine lines on said tachometer, means (40) connected to said tachometer for counting said lines during one revolution of said second one of, said motors, means (42) connected to said counting means for calculating the radii of said reel to reel tape, and means (10) connected to said second motor for determining said one revolution of said second motor, said second motor comprising a multiple pole brushless DC motor having two magnetic outputs (HI and H2) and said determining means comprising:

means (800 and 840) connected to said second motor for providing a plurality of count control outputs (Z), each of said outputs corresponding to the passing of a pole-pair in said second motor, one of said count control outputs corresponding to counting up when a pole-pair is passed in the forward direction and one of said count control outputs corresponding to counting down when a pole-pair is passed in the reverse direction, means (810) connected to said providing means and receptive of said count control outputs for counting the number of pole-pairs as said second motor turns in said forward and reverse directions, and means (830) connected to said counting means for issuing an output signal corresponding to said one revolution of said second motor.

2. A reel to reel tape (20) transport system having first and second motors (MI, M2) for driving the reel to reel tape, a tachometer (30) connected to a first one of said motors for generating a plurality of output pulses corresponding to a plurality of fine lines on said tachometer, means (40) connected to said tachometer for counting said lines during one revolution of said second one of said motors, means (42) connected to said counting means for calculating the radii of said reel to reel tape, and means (10) connected to said second motor for determining said one revolution of said second motor, said second motor comprising a multiple pole brushless DC motor having two magnetic outputs (HI and H2) and said determining means comprising:

means (840) connected to said second motor for generating a forward series of pulses (FOR) when said second motor is turning in the forward direction (310) and a reverse series of pulses (REV) when said second motor is turning in the reverse direction (320), each of said pulses in said forward and reverse series of pulses corresponding to the passing of a pole-pair in said second motor, means (800) connected to said generating means and receptive of said forward and reverse series of pulses for providing a plurality of count control output (Z), one of said count control outputs corresponding to counting up and one of said count control outputs corresponding to counting down, means (810) connected to said providing means and receptive of said count control outputs for counting the number of pole-pairs as said second motor turns in said forward and reverse directions, and means (830) connected to said counting means for issuing an output signal corresponding to said one revolution of said second motor.

3. A reel to reel tape (20) transport system having first and second motors (M1, M2) for driving the reel to reel tape, a tachometer (30) connected to a first one of said motors for generating a plurality of output pulses corresponding to a plurality of fine lines on said tachometer, means (40) connected to said tachometer for counting said lines during one revolution of said second one of said motors, means (42) connected to said counting means for calculating the radii of said reel to reel tape, and means (10) connected to said second motor for determining said one revolution of said second motor, said second motor comprising a multiple pole motor having two magnetic outputs (H1 and H2) and said determining means comprising:

means (840) connected to said second motor for generating a forward series of pulses (FOR) when said second motor is turning in the forward direction (310) and a reverse series of pulses (REV) when said second motor is turning in the reverse direction (320), each of said pulses in said forward and reverse series of pulses corresponding o the passing of a pole-pair in said second motor, means (800) connected to said generating means and receptive of said forward and reverse series of pulses for providing a plurality of count control outputs (Z), one of said count control outputs corresponding to counting up and one of said count control outputs corresponding to counting down, means (810) connected to said providing means and receptive of said count control outputs for counting the number of pole-pairs as said second motor turns in said forward and reverse directions prior to the completion of said one revolution, and means (830) connected to said counting means for issuing an output signal corresponding to said one revolution of said second motor.

4. In a reel to reel tape (20) transport system having first and second motors (M1, M2) for driving the reel to reel tape, a tachometer (30) connected to a first one of said motors for generating a plurality of output pulses corresponding to a plurality of fine lines on said tachometer, means (40) connected to said tachometer for counting said lines during one revolution of said second one of said motors, means (42) connected to said counting means for calculating the radii of said reel to reel tape, and said second motor comprising a multiple pole brushless DC motor having two magnetic outputs (H1 and H2), a method for determining the revolutions of said second motor comprising the steps of:

- generating a forward series of pulses (FOR) when said second motor is turning in the forward direction (310) and a reverse series of pulses (REV) when said second motor is turning in the reverse direction (320), each of said pulses in said forward and reverse series of pulses corresponding to the passing of a pole-pair in said second motor,
- providing a plurality of count control outputs. (Z), one of said count control outputs corresponding to counting up and one of said count control outputs corresponding to counting down, in response to the step of generating the forward and reverse series of pulses,
- counting the number of pole-pairs as said second motor turns in said forward and reverse directions in response the step of providing a plurality of count control outputs, and
- issuing an output signal corresponding to said one revolution of said second motor based upon said count.

5. A reel to reel tape (20) transport system having first and second motors (M1, M2) for driving the reel to reel tape, a tachometer (30) connected to a first one of said motors for generating a plurality of output pulses corresponding to a plurality of fine lines on said tachometer, means (40) connected to said tachometer for counting said lines during one revolution of said second one of said motors, means (42) connected to said counting means for calculating the radii of said reel to reel tape, and means (10) connected to said second motor for determining said one revolution of said second motor, said second motor comprising a multiple pole brushless DC motor having two magnetic outputs (H1 and H2) and said determining means comprising:

- a clock for generating a series of clock pulses at a given frequency,
- means (840) connected to said second motor and to said clock for generating a forward series of pulses (FOR) when said second motor is turning in the forward direction (310) and a reverse series of pulses (REV) when said motor is turning in the reverse direction (320), each of said pulses in said forward and reverse series of pulses being synchronized to said clock and corresponding to the passing of a pole-pair in said second motor,
- means (800) connected to said generating means and receptive of said forward and reverse series of pulses for providing a plurality of count control outputs (Z), said plurality of count control outputs (Z) being generated from the following state table:

| FR | 00 | 01 | 11 | 10 |
|----|------|------|------|------|
| S0 | S0 Z = 0 | S1 Z = 0 | S0 Z = 0 | S3 Z = 0 |
| S1 | S1 Z = 3 | S1 Z = 2 | S1 Z = 3 | S2 Z = 3 |
| S2 | S2 Z = 3 | S1 Z = 3 | S2 Z = 3 | S3 Z = 1 |
| S3 | S3 Z = 3 | S4 Z = 3 | S3 Z = 3 | S3 Z = 1 |
| S4 | S4 Z = 3 | S1 Z = 2 | S4 Z = 3 | S3 Z = 3 | where the designation "FR" means "forward", 80-S4 are states, and Z equals:
- Z=0—(reset counter)
- Z=1—(count down)
- Z=2—(count up)
- Z=3—(hold counter)
- means (810) connected to said providing means and receptive of said count control outputs for counting the number of pole-pairs as said second motor turns in said forward and reverse directions, and
- means (830) connected to said counting means for issuing an output signal corresponding to said one revolution of said second motor.

* * * * *